US012390945B2

(12) United States Patent
Wu

(10) Patent No.: US 12,390,945 B2
(45) Date of Patent: Aug. 19, 2025

(54) MULTI-FUNCTIONAL SMALL ROTARY SHAVING ASSEMBLY

(71) Applicant: Rangpan Wu, Zhongshan (CN)

(72) Inventor: Rangpan Wu, Zhongshan (CN)

( * ) Notice: Subject to any disclaimer, the term of this patent is extended or adjusted under 35 U.S.C. 154(b) by 286 days.

(21) Appl. No.: 17/922,001

(22) PCT Filed: Dec. 17, 2020

(86) PCT No.: PCT/CN2020/137197

§ 371 (c)(1),
(2) Date: Oct. 28, 2022

(87) PCT Pub. No.: WO2021/253765

PCT Pub. Date: Dec. 23, 2021

(65) Prior Publication Data

US 2023/0166414 A1 Jun. 1, 2023

(30) Foreign Application Priority Data

Jun. 19, 2020 (CN) ........................ 202010564064.X

(51) Int. Cl.
*B26B 19/14* (2006.01)
*B26B 19/38* (2006.01)

(52) U.S. Cl.
CPC ........ *B26B 19/141* (2013.01); *B26B 19/3853* (2013.01); *B26B 19/148* (2013.01)

(58) Field of Classification Search
USPC .................................................. 30/29.5, 43.6
See application file for complete search history.

(56) References Cited

U.S. PATENT DOCUMENTS 3,292,251 A * 12/1966 Bakker ................. B26B 19/384 30/34.2
3,925,888 A * 12/1975 Bozsanyi .............. B26B 19/148 30/29.5

(Continued)

FOREIGN PATENT DOCUMENTS

CN 200977660 Y 11/2007
CN 201168968 Y 12/2008

(Continued)

OTHER PUBLICATIONS

English translation of WO-2024222773-A1, Oct. 31, 2024.*

(Continued)

*Primary Examiner* — Hwei-Siu C Payer

(57) ABSTRACT

A multi-functional small rotary shaving, includes a cutter head cover and a moving cutter assembly. The moving cutter assembly includes moving cutter and support for holding moving cutter, cutter head cover includes cover head and cover body which are integrated up and down, cover head includes cover top and cover wall connected to outer side of cover top, cover top and cover wall enclose to form one cutting cavity for moving cutter to rotate inside, and cover head has multiple hair inlet slots in circumferential direction for communicating inside with outside of cover head; hair inlet slots cross from cover top to cover wall and passes through cover top longitudinally and cover wall transversely at same time, and turning joint between cover top and cover wall has horn-shaped hair guiding openings which correspond to hair inlet slots and which are used for guiding hair into hair inlet slots.

19 Claims, 12 Drawing Sheets

(56) References Cited

U.S. PATENT DOCUMENTS

| | | | | |
|---|---|---|---|---|
| 7,401,406 | B2 * | 7/2008 | Morisugi | B26B 19/148 30/29.5 |
| 2005/0028369 | A1 | 2/2005 | Cocchiarella et al. | |
| 2011/0072669 | A1 * | 3/2011 | Morisugi | B26B 19/148 30/29.5 |
| 2011/0232096 | A1 * | 9/2011 | Yabuuchi | B26B 19/38 30/29.5 |
| 2016/0089799 | A1 * | 3/2016 | Mimura | B26B 19/143 30/43.6 |
| 2023/0166414 | A1 * | 6/2023 | Wu | B26B 19/145 30/43.6 |

FOREIGN PATENT DOCUMENTS

| | | | |
|---|---|---|---|
| CN | 102029621 | A | 4/2011 |
| CN | 103522312 | A | 1/2014 |
| CN | 203579699 | U | 5/2014 |
| CN | 206937377 | U | 1/2018 |
| CN | 109531635 | A | 3/2019 |
| CN | 109551531 | A | 4/2019 |
| CN | 209036592 | U | 6/2019 |
| CN | 209207571 | U | 8/2019 |
| CN | 111645115 | A | 9/2020 |
| CN | 111645116 | A | 9/2020 |
| WO | WO-2024222773 | A1 * | 10/2024 |

OTHER PUBLICATIONS

Mar. 2, 2021 International Search Report issued in International Patent Application No. PCT/CN2020/137197.

Mar. 2, 2021 Written Opinion issued in International Patent Application No. PCT/CN2020/137197.

* cited by examiner

MULTI-FUNCTIONAL SMALL ROTARY SHAVING ASSEMBLY

TECHNICAL FIELD

The present invention relates to a multi-functional small rotary shaving assembly.

BACKGROUND ART

A human body has body hairs in many parts. With today's diverse pursuit of beauty, there are eyebrow trimming, nose hair trimming, and lettering characters or pattern engraving on the top of a head by shaving the hairs, etc., which create a variety of shaving tools for shaving and cutting body hair in different parts.

With eyebrow-trimming, there are manual eyebrow trimmers with which when a person conducts eyebrow trimming, a mirror is needed for viewing. Besides, due to the uneven skin surface, the hand needs to enforce strength to conduct shaving, and it is not conducive in controlling the range of shaving and scraping. When the hand enforcing the strength is not well controlled, a wider or a smaller area than expected is shaved, or the skin is even cut. A small rotary automatic cutting eyebrow trimmer appears after the manual eyebrow trimmer, and the eyebrow trimmer has an eyebrow trimming head, such as the technical solution shown in application number CN201821817498, entitled an eyebrow trimmer cutter-head device, wherein a first blade and a second blade are covered by a cutter head cover with a small radius which is convenient for facilitate shaping, multiple straight slot-shaped cutter slots are provided on the cutter head cover in the circumferential direction for the eyebrow to enter, and the first blade and the second blade are driven to rotate in the cutter head cover by a rotary shaft to cut the eyebrow Since eyebrows have a certain length and flexibility, a straight slot structure is usually used to let the hair in, and at the same time, individual hair inlet holes can also be provided at the top for hair roots with most of the length cut off to enter cutting, such as the cutter head cover structure of patent CN201821817498; however, since the straight slot structure is relatively easy to be fed by skin extrusion, in order to ensure safety and not to cut skin, the width of the straight slot structure needs to be small. The small width of the straight slot results in a small hair inlet hole, which causes difficulty in hair inlet, thereby leading to a very poor hair inlet efficiency of the existing rotary automatic eyebrow trimmer.

With regard to the existing rotary automatic eyebrow trimmer, in order to enable the blade in the cutter head cover to abut against the inner wall of the cutter head cover to ensure the cutting sharpness, as shown in patent CN201821817498, a first blade and a second blade are usually movably mounted on a rotary shaft, and the first blade and the second blade are pushed out to the side by the elasticity of a blade spring so that the first blade and the second blade push against the inner wall of the cutter head cover, and usually the head of the cutter head cover is configured as a conical structure and has a cutting area at the top plane and at the conical side. After a long time of use, the blade has different degrees of wear between the top cutting edge and the side cutting edge, and the top cutting edge and the side cutting edge of the blade can be respectively compensated for wear under the lateral springing of the blade spring and the upward springing of a lifting spring to ensure the cutting sharpness. However, the above-mentioned connection and mounting structure of the first blade, the second blade, the blade spring, the rotary shaft, and the cutter head cover is complicated, and the first blade, the second blade, the blade spring, and the rotary shaft need to be separately produced, and the matching structure between the first blade, the second blade, the blade spring, and the rotary shaft is complicated, and the production cost of a mould is high. When assembling, the first blade, the second blade, and the blade spring need to be correspondingly mounted in a guide rail clamping slot on the rotary shaft, and the first blade and the second blade need to be held by hand to prevent the blade spring from popping the same out and making it loosen and fall off, and then slowly inserted into the cutter head cover. The production process is complicated, and the convenience is poor.

Nose hair trimmers have nose hair scissors, which are small scissors. A small rotary automatic cutting nose hair cutter has also been developed. The cutter heads of the nose hair cutter and the eyebrow trimming cutter are somewhat similar in structure, in both cases, a cutter head cover with a small radius is used, and a rotary-cutting moving cutter assembly is provided in the cutter head cover. However, the use of the eyebrow trimming cutter cannot trim nose hairs, because the nose hairs grow on the inner wall of a nasal cavity and cross each other to grow in the nasal cavity, and the cutter head cover of the eyebrow trimming cutter cannot effectively let the nose hairs into the interior thereof. Therefore, the cutter head cover of the nose hair cutter needs to be specially designed. As shown in the technical solution of the application number CN200620131104.7 entitled nose hair cutter, the nose hair cutter head thereof is generally a top surface composed of a mesh-type blade with a small radius that can extend into the nasal cavity, also called a cutter head cover, through multiple bending units. The multiple bending units enclose a nose hair suction inlet on the top surface, and two adjacent bending units form a slit-type slot, the slot communicating with the nose hair suction inlet. A movable blade capable of rotating and cutting is provided on the inner side of the bending unit, and the movable blade rotates and cuts along the inner wall of the side surface of the cutter head cover. However, the slit-type slot is narrow. In order to avoid the scenario that the meat is squeezed in and the width of the slot cannot be widened, the way of hair inlet is basically that the nose hairs enter from the nose hair suction inlet in the middle part and respectively enter different slots for cutting. Then, when the nostril is inserted, the nose hair opposite to the nose hair suction inlet is easy to enter for cutting. It is difficult for the nose hair that protrudes laterally from the side wall of the nostril beyond the nose hair suction inlet to enter the cutter head cover for cutting so that the efficiency of hair entry is also not good. In addition, the moving cutter assembly of the nose hair cutter also generally adopts a similar structure as in application number CN201821817498, and the structure and assembly process are complicated and the manufacturing cost is high.

However, since the nose hair cutter has only a side cutting position, and the top surface does not cut and has a large through-hole (nose hair suction inlet), it is also generally used only for cutting body hair in an inner cavity like a nasal cavity from both safety and cutting performance perspectives.

In addition, it is common to use a hair cutting cutter for lettering characters, patterns, etc. on a head, and the largest difference between the hair cutting cutter and a general hair scissor is that the width of the cutter head for cutting hairs is small, so as to cut and engrave hairs in a small range. For example, according to the technical solution shown in application number CN201320724635.7 entitled "hair scissor lettering knife blade", the greatest benefit of the cutter head is a simple structure. But since it cuts by swinging, it has a limited cutting width, which cannot be made as small as a rotary nose hair cutter or an eyebrow trimmer. Then, the lines of the lettering strokes or patterns are limited to a great extent, which cannot satisfy the using requirements. In addition, when using a hair-cutting lettering cutter, it is necessary to push forward to shave the hair, making it inconvenient to letter or engrave a pattern by oneself. Therefore, it is usually only possible to shave the hair by others.

As mentioned above, when a consumer needs shaving in multiple parts such as nose hair, eyebrow, lettering, etc., one needs to buy different types of shaving tools. On one hand, it is costly, and on the other hand, so many of them need to occupy living space and make it inconvenient. Although the concept between the individual shaving tools is novel, the actual use effect is not good and the social reaction is not good due to the defects of one or the other, which leads to the limitation of current market promotion.

What we focus on is a multi-functional small rotary shaving assembly which is a new design that can meet the using requirements of nose hair, eyebrows, head lettering, etc. at the same time, and meanwhile, it addresses the shortcomings of the above-mentioned shaving tools.

SUMMARY OF THE INVENTION

The technical problem to be solved by the present invention is to provide a multi-functional small rotary shaving assembly, which has the features of a simple structure, a good hair inlet effect, a high hair-shaving efficiency, and safe shaving. Besides, it can be simultaneously applied to eyebrow trimming, nose hair trimming, head lettering and hair pattern engraving, etc.

The present invention is achieved by the following technical solutions:

a multi-functional small rotary shaving assembly comprising a cutler head cover and a moving cutter assembly. The moving cutter assembly comprises a moving cutter and a support for holding the moving cutter, the cutter head cover comprises a cover head and a cover body which are integrated up and down, the cover head comprises a cover top and a cover wall connected to the outer side of the cover top, the cover top and the cover wall enclose to form one cutting cavity for the moving cutter to rotate inside, and the cover head is provided with multiple hair inlet slots in a circumferential direction for communicating the inside with the outside of the cover head; the hair inlet slots cross from the cover top to the cover wall and passes through the cover top longitudinally and the cover wall transversely at the same time, and a turning joint between the cover top and the cover wall is provided with horn-shaped hair guiding openings which correspond to the hair inlet slots and which are used for guiding the hair into the hair inlet slots.

According to the multi-functional small rotary shaving assembly as mentioned above, the moving cutter comprises a moving cutter body, a side cutter for laterally cutting hairs in the hair inlet slots on the cover wall is provided on the side of the moving cutter body, an elastic arm fixedly connecting the side cutter and the moving cutter body and elastically pressing the side cutter against an inner wall of the cover wall is provided between the side cutter and the moving cutter body, and the elastic arm and the side cutter are located on the outer side of the support; an upward top cutter is provided between the inner side of the side cutter and the rotational center of the moving cutter body on the moving cutter body, and the top cutter is separated from the side cutter and the elastic arm; the top cutter is exposed above the support and is used to cut the hair in the hair inlet slots on the cover top.

According to the multi-functional small rotary shaving assembly as mentioned above, the hair inlet slots forms a "7"-shaped structure by means of a cover top section located on the cover top and the cover wall section located on a cover wall. The horn-shaped hair guiding openings are connected between the corresponding cover top section and the cover wall section of the hair inlet slots, the side cutter is located below the horn-shaped hair guiding openings, and the top cutter is located on the inner side of the horn-shaped hair guiding openings. An avoiding opening for avoiding the horn-shaped hair guiding openings is formed between the top cutter and the side cutter.

According to the multi-functional small rotary shaving assembly as mentioned above, the horn-shaped hair guiding openings are located on the outer side of the rotary cutting region S1 of the top cutter, and the inner end of the hair inlet slots is located in the rotary cutting region S1 of the top cutter the horn-shaped hair guiding openings are located above the rotary cutting region S2 of the side cutter, and the lower end of the hair inlet slots is located in the rotary cutting region of the side cutter.

According to the multi-functional small rotary shaving assembly as mentioned above, the top cutter, side cutter, elastic arm, and moving cutter body are integrally press formed, the moving cutter body being integrally injection molded with the support.

According to the multi-functional small rotary shaving assembly as mentioned above, the side cutter and the elastic arm and the top cutter are respectively provided with two around the direction of rotation.

According to the multi-functional small rotary shaving assembly as mentioned above, the top of the support is provided with a central positioning slot coaxial with the center of rotation of the support, a slot is provided at a position of the moving cutter corresponding to the central positioning slot for the central positioning slot to be exposed upwards, the center of the cover top is provided with a central positioning hole corresponding to the central positioning slot, the central positioning hole is isolated from the hair inlet slots, a positioning pin passing through the central positioning hole and inserted into the central positioning slot is fixed on the cover top, and the positioning pin matches with the central positioning slot and limits the lateral swinging of the support; at the same time, the support frame rotates and floats up and down relative to the positioning pin.

According to the multi-functional small rotary shaving assembly as mentioned above, the positioning pin is located on the inner side of the area enclosed by the cover top sections of multiple hair inlet slots.

According to the multi-functional small rotary shaving assembly as mentioned above, the moving cutter comprises a moving cutter body. A side cutter for laterally cutting hairs in the hair inlet slots on the cover wall is provided on the side of the moving cutter body, an elastic arm fixedly connecting the side cutter and the moving cutter body and elastically pressing the side cutter against an inner wall of the cover wall is provided between the side cutter and the moving cutter body, and the elastic arm and the side cutter are located on the outer side of the support.

According to the multi-functional small rotary shaving assembly as mentioned above, the cover wall has a conical structure, the side cutter being inclined at an angle to the center of rotation thereof and making its path of rotation forming a conical area corresponding to the cover wall, and the elastic arm being inclined and corresponding to the side cutter.

According to the multi-functional small rotary shaving assembly as mentioned above, the side cutter has a side cutting edge, the side cutter being inclined in the direction of rotary cutting, and the included angle a between the side cutting edge and the cover wall on its tangent line being an acute angle.

According to the multi-functional small rotary shaving assembly as mentioned above, the moving cutter comprises a moving cutter body provided only with an upwardly facing top cutter which is exposed above the support and which is used for the rotary cutting of hairs in the hair inlet slots on the cover top.

According to the multi-functional small rotary shaving assembly as mentioned above, the top cutter is provided with a top cutting edge, the top cutter is inclined in the direction of rotary cutting, and the included angle b between the top cutting edge and the cover top is an acute angle.

According to the multi-functional small rotary shaving assembly as mentioned above, the support is provided with multiple positioning posts along its circumference for abutting against the inner wall of the cutter head cover for rotational positioning.

According to the multi-functional small rotary shaving assembly as mentioned above, the bottom of the support is provided with a driving interface for connecting to an external driving device, and the inner side of the driving interface is provided with a spring placing slot which is concave upward for a lifting spring to be placed.

According to the multi-functional small rotary shaving assembly as mentioned above, the elastic arm is of a U-shaped structure.

According to the multi-functional small rotary shaving assembly as mentioned above, the horn-shaped hair guiding openings have an outwardly inclined upwardly V-shaped structure and respectively form a Y-shaped structure with a hair inlet slot at the cover top and a hair inlet slot at the cover wall.

According to the multi-functional small rotary shaving assembly as mentioned above, the cover top has a flat top structure or a convex spherical arcuate structure.

According to the multi-functional small rotary shaving assembly as mentioned above, the hair inlet slots are open in the radial direction of the cover head.

According to the multi-functional small rotary shaving assembly as mentioned above, multiple hair inlet slots are evenly distributed in the circumferential direction on the cover head.

According to the multi-functional small rotary shaving assembly as mentioned above, the cover head is circular in cross-section and the cover wall is of the cylindrical or conical structure.

According to the multi-functional small rotary shaving assembly as mentioned above, the cover head has an outer diameter R1 of less than 8 mm when the cover wall is of cylindrical structure; when the cover wall has a conical structure, the outer diameter R2 of the cover top is less than 6 mm and the included angle D between the cover wall and the central axis is between 5° and 45°.

Compared with the prior art, the present invention has the following advantages.

1. According to the small rotary shaving assembly of the present invention, horn-shaped hair guiding openings corresponding to the hair inlet slots and used for guiding hairs into the hair inlet slots are provided at the turning joint between the cover top and the cover wall. The width of two adjacent hair inlet slots at the outer periphery of the cover top is used so that the horn-shaped hair guiding openings can be provided wider than the hair inlet slots while designing the hair inlet slots to have a suitable width to ensure safety. Since the horn-shaped hair guiding openings are provided at the turning joint between the cover top and the cover wall, and the horn-shaped hair guiding openings are relatively large, it can guide the hairs into the hair inlet slots from the top, and can guide the hairs into the hair inlet slots from the side, and can guide the hairs in from any inclined direction between the top and the side, so that the hair-inlet efficiency is high, thereby improving the hair-inlet efficiency of the hair inlet slots. Moreover, it can be used for the hair inlet of eyebrows, nose hair, and hair short-shaving at the same time so that the shaving and cutting of hairs in different body positions can be realized in combination with the moving cutter assembly.
2. The moving cutter body of the present invention is provided with a top cutter at the top, and is connected with a side cutter via an elastic arm. The top cutter is separated from the side cutter and the elastic arm, and the elastic arm presses the side cutter elastically on the inner wall of the cover wall, so that the small rotary shaving assembly has two cutting positions of a top surface and a side surface at the same time. On the basis that the cutter head cover can well feed hair for the eyebrow, nose hair, and short-shaved hair and other multi-body positions, and integrates eyebrow trimming, nose hair trimming, and head lettering and hair engraving into one, it avoids buying different types of shaving tools in life, reduces living costs, saves living space, and greatly facilitates people's lives.
3. According to the present invention, by separately providing the top cutter and the side cutter, and elastically pressing the side cutter outwards via the elastic arm, the wear compensation of the side cutter is realized, so as to ensure the cutting sharpness. The wear compensation of the top cutter is realized by elastically pressing the moving cutter assembly upwards via an external lifting spring. Therefore, the moving cutter can be directly fixedly connected to the support, simplifying the structure of the moving cutter assembly. Furthermore, the top cutter, the side cutter, the elastic arm, and the moving cutter body are press formed integrally. The moving cutter body is integrally injection-molded with the support. The moving cutter assembly is composed of the moving cutter and the support with few members, a simple production process, and low production costs. Furthermore, the assembly production of the moving cutter assembly and the cutter head cover is simple and convenient, which greatly improves production efficiency and reduces costs.
4. According to the present invention, the top cutter and the side cutter are arranged separately so that the top cutter and the side cutter avoid the position of the horn-shaped hair guiding openings, and the horn-shaped hair guiding openings are located on the outer side of the rotary cutting region S1 of the top cutter, and the horn-shaped hair guiding openings are located above the rotary cutting region S2 of the side cutter, so as to protect the skin. The inner end of the hair inlet slots is located in the rotary cutting region S1 of the top cutter, then the top cutter has one section located on the inner side of the inner end of the hair inlet slots to protect the top cutter, and the other section is opposite to the hair inlet slots to ensures effective cutting; the lower end of the hair inlet slots is located in the rotary cutting region S2 of the side cutter, then one section of the side cutter is located below the lower end of the hair inlet slots to protect the side cutter, and the other section is opposite to the hair inlet slots to ensure effective cutting.

5. According to the present invention, the cover wall is of a conical structure, the side cutter is inclined at a certain angle with respect to the center of rotation thereof and the rotation path forms a conical region corresponding to the cover wall; the elastic arm is inclined and corresponds to the side cutter, and the cover head 11 of a conical structure can be made small at the top end so as to allow a more precise cutting position when shaving, and also to facilitate the insertion into a nostril and the nose hair feeding hair from the tapered bevel and the top surface. Also, when two or more side cutters and the elastic arms are provided, the cover wall of the tapered structure is combined with the side cutter and the elastic arm, and the side cutter can automatically compensate for wear and abut against the cover wall, and automatically center.

BRIEF DESCRIPTION OF THE DRAWINGS

Specific implementation modes of the present invention are described in further detail below with reference to the accompanying letterings, in which.

DETAILED DESCRIPTION OF THE INVENTION

Figure 1:
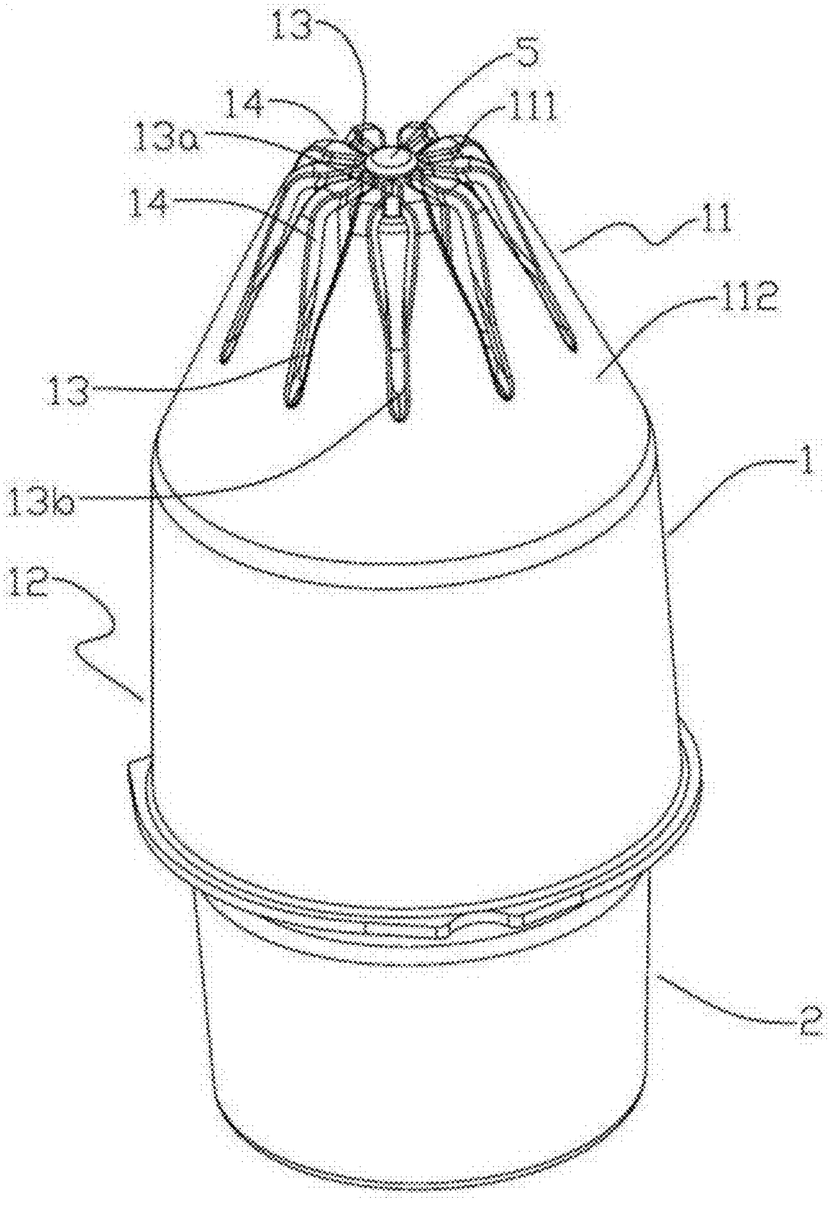
FIG. 1 is a schematic view of a structure of an implementation of a multi-functional small rotary shaving assembly of the present invention.
Figure 2:
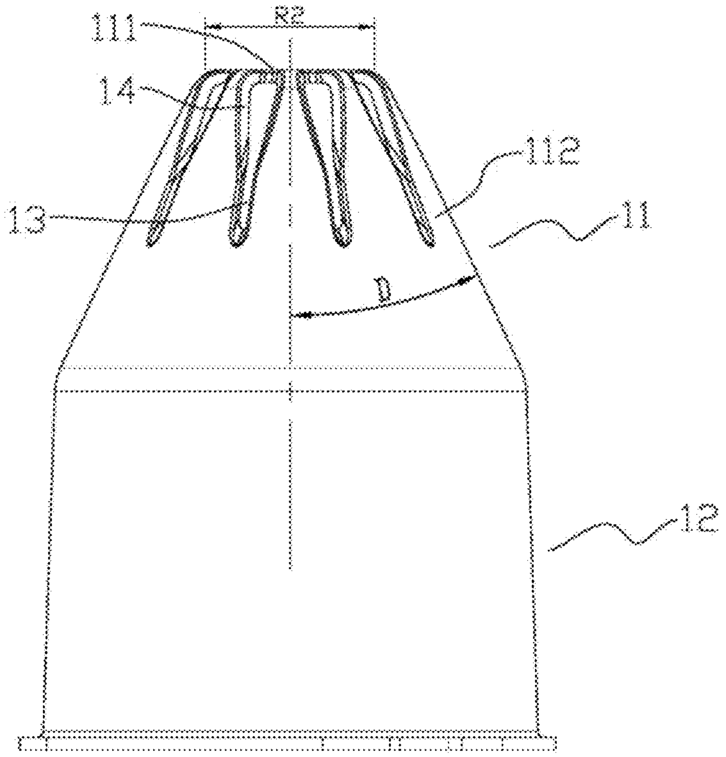
FIG. 2 is a side view of a cutter head cover having a tapered structure.
Figure 3:
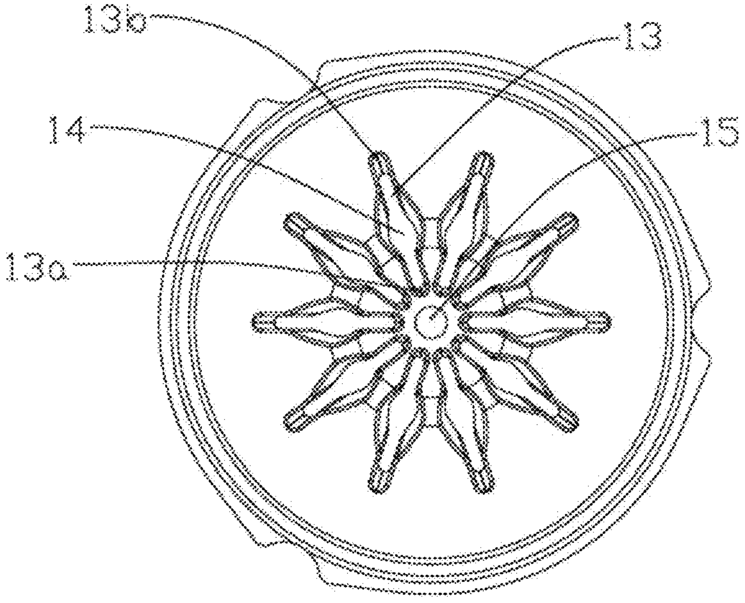
FIG. 3 is a top view of a cutter head cover having a tapered structure.
Figure 4:
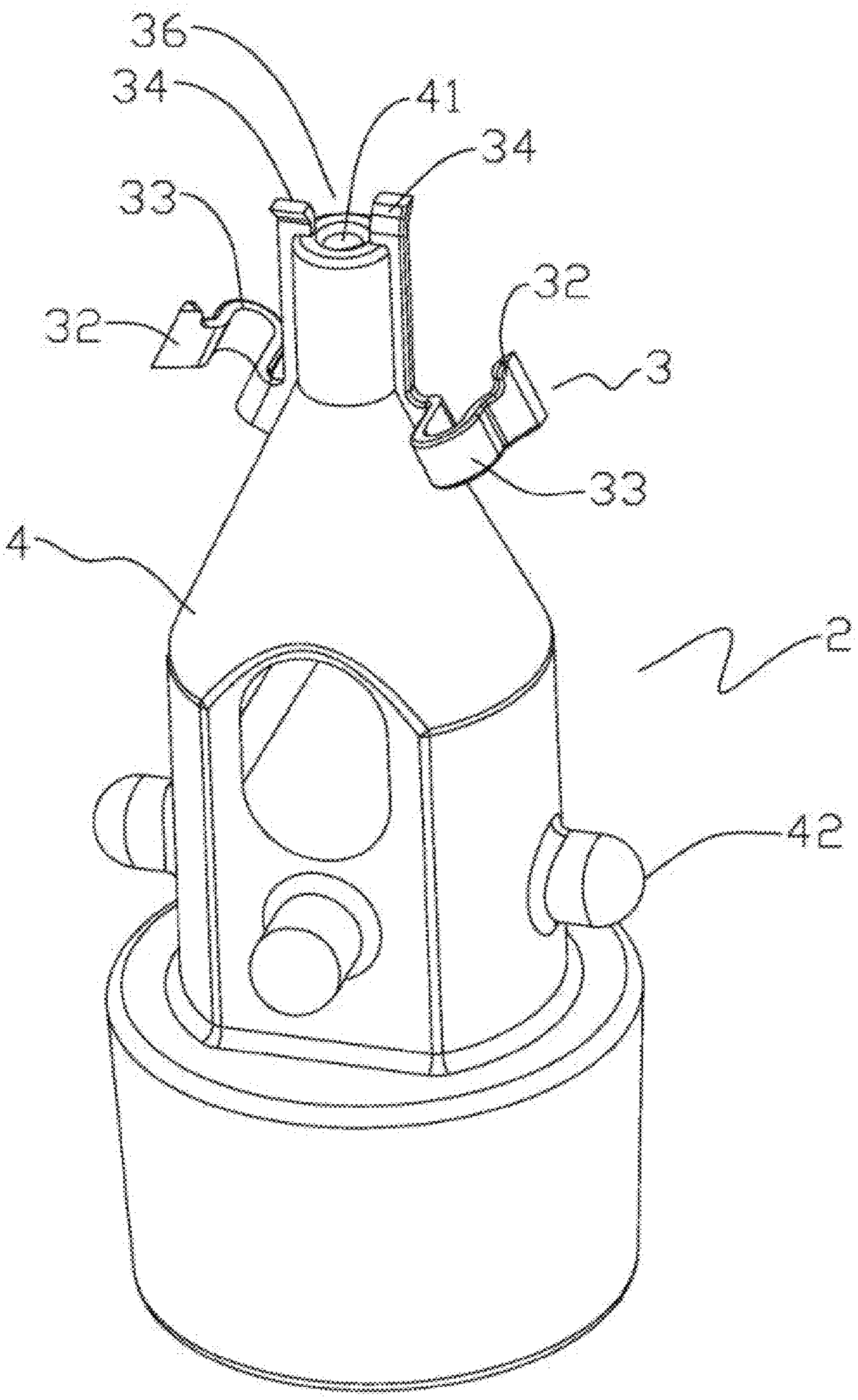
FIG. 4 is a schematic view of a structure of an embodiment of a moving cutter assembly.

The invention will now be further described with reference to the accompanying letterings.

As shown in FIGS. 1 to 15, a multi-functional small rotary shaving assembly comprises a cutter head cover 1 and a moving cutter assembly 2. The moving cutter assembly 2 comprises a moving cutter 3 and a support 4 for holding the moving cutter 3, the cutter head cover 1 comprises a cover head 11 and a cover body 12 which are integrated up and down, the cover head 11 comprises a cover top 111 and a cover wall 112 connected to the outer side of the cover top 111, the cover top 111 and the cover wall 112 enclose to form one cutting cavity 110 for the moving cutter 3 to rotate inside, and the cover head 11 is provided with multiple hair inlet slots 13 in a circumferential direction for communicating with the inside and the outside of the cover head 11; the multiple hair inlet slots 13 are not connected and independently from each other, and the hair inlet slots 13 crosses from the cover top 111 to the cover wall 112 and pass through the cover top 111 longitudinally and the cover wall 112 transversely at the same time, and a turning joint between the cover top 111 and the cover wall 112 is provided with horn-shaped hair guiding openings 14 which corresponds to the hair inlet slots 13 and which are used for guiding the hair into the hair inlet slots 13. With the width of the adjacent two hair inlet slots 13 at the outer periphery of the cover top 111, the horn-shaped hair guiding openings 14 can be provided to be wider than the hair inlet slots 13, for example, to more than 1.5 times or more than twice the width of the hair inlet slots 13, while designing the hair inlet slots 13 to have an appropriate width to ensure safely. Since the horn-shaped hair guiding openings 14 are provided at the turning joint between the cover top 111 and the cover wall 112, and the horn-shaped hair guiding openings 14 are relatively large, it can guide the hairs into the hair inlet slots 13 from the top, and can guide the hairs into the hair inlet slots 13 from the side, and can guide the hairs in from any inclined direction between the top and the side, so that the hair-inlet efficiency is high, thereby improving the hair-inlet efficiency of the hair inlet slots 13. Moreover, it can be used for the hair inlet of eyebrows, nose hair, and hair short-shaving at the same time so that the shaving and cutting of hairs in different body positions can be realized in combination with the moving cutter assembly 2.

As shown in FIGS. 4 to 11, as an embodiment of the moving cutter 3, the moving cutter 3 comprises a moving cutter body 31, a side cutter 32 for laterally cutting hairs in the hair inlet slots 13 on the cover wall 112 is provided on the side of the moving cutter body 31, an elastic arm 33 fixedly connecting the side cutter 32 and the moving cutter body 31 and elastically pressing the side cutter 32 against an inner wall of the cover wall 112 is provided between the side cutter 32 and the moving cutter body 31, and the elastic arm 33 and the side cutter 32 are located on the outer side of the support 4; an upward top cutter 34 is provided between the inner side of the side cutter 32 and the rotational center of the moving cutter body 31 on the moving cutter body 31, and the top cutter 34 is separated from the side cutter 32 and the elastic arm 33; the top cutter 34 is exposed above the support 4 and is used to cut the hair in the hair inlet slots 13 on the cover top 111. The small rotary shaving assembly has two cutting positions at the same time at the top surface and the side surface. On the basis of realizing hair inlet of multiple body positions, eyebrow trimming, nose hair trimming, head lettering and pattern engraving are integrated to avoid purchasing different types of shaving tools in life, thereby reducing the living cost, saving living space, and greatly facilitating people's lives.

Furthermore, by separately providing the top cutter 34 and the side cutter 32, and elastically pressing the side cutter 32 outwards via the elastic arm 33, the wear compensation of the side cutter 32 is realized, so as to ensure the cutting sharpness. The wear compensation of the top cutter 34 is realized by elastically pressing the moving cutter assembly 2 upwards via an external lifting spring. Therefore, the moving cutter 3 can be directly fixedly connected to the support 4, simplifying the structure of the moving cutter assembly 2. Preferably, the top cutter 34, the side cutter 32, the elastic arm 33, and the moving cutter body 31 are press formed integrally. The moving cutter body 31 is integrally injection-molded with the support 4. The moving cutter assembly 2 is composed of the moving cutter 3 and the support 4 with few members, a simple production process, and low production costs. Furthermore, the assembly production of the moving cutter assembly 2 and the cutter head cover 1 is simple and convenient, which greatly improves production efficiency and reduces costs.

Figure 5:
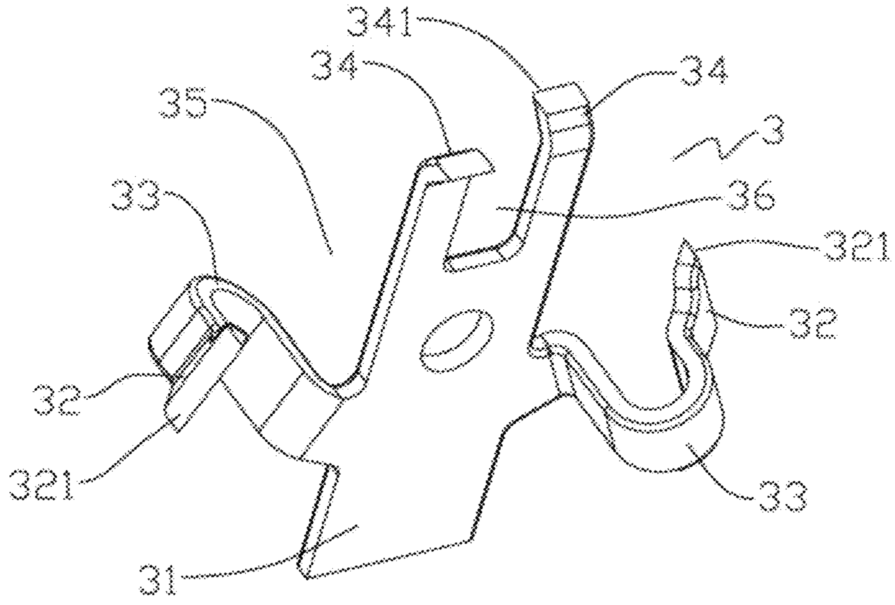
FIG. 5 is schematic view 1 of a structure of an embodiment of a moving cutter.
Figure 6:
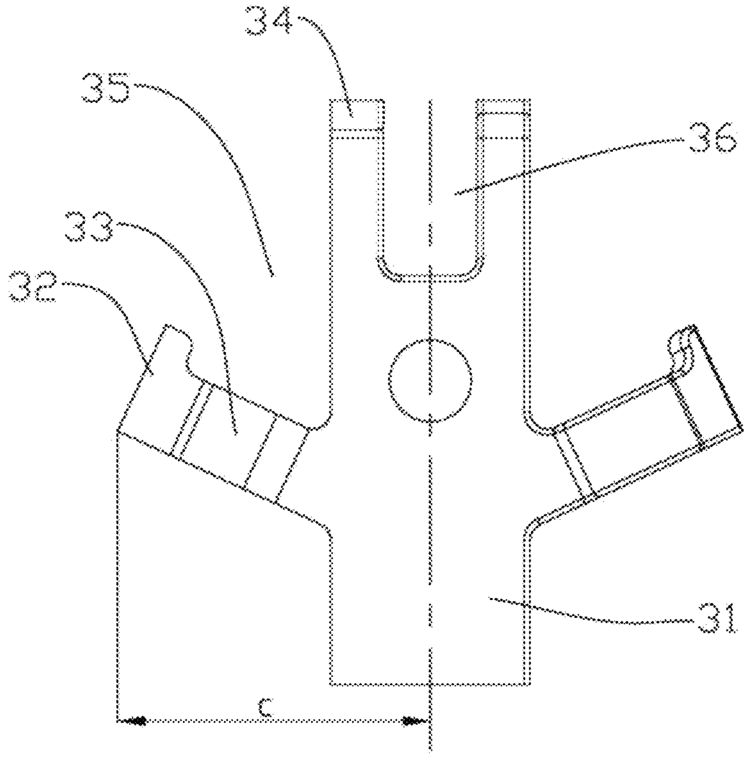
FIG. 6 is schematic view 2 of a structure of an embodiment of a moving cutter.

As shown in FIG. 5, as an implementation mode of the elastic arm 33, the elastic arm 33 has a U-shaped structure to facilitate press forming.

The bottom of the support 4 is provided with a driving interface 43 for connecting to an external driving device, and the inner side of the driving interface 43 is provided with a spring placing slot 44 which is concave upward for a lifting spring to be placed.

Figure 11:
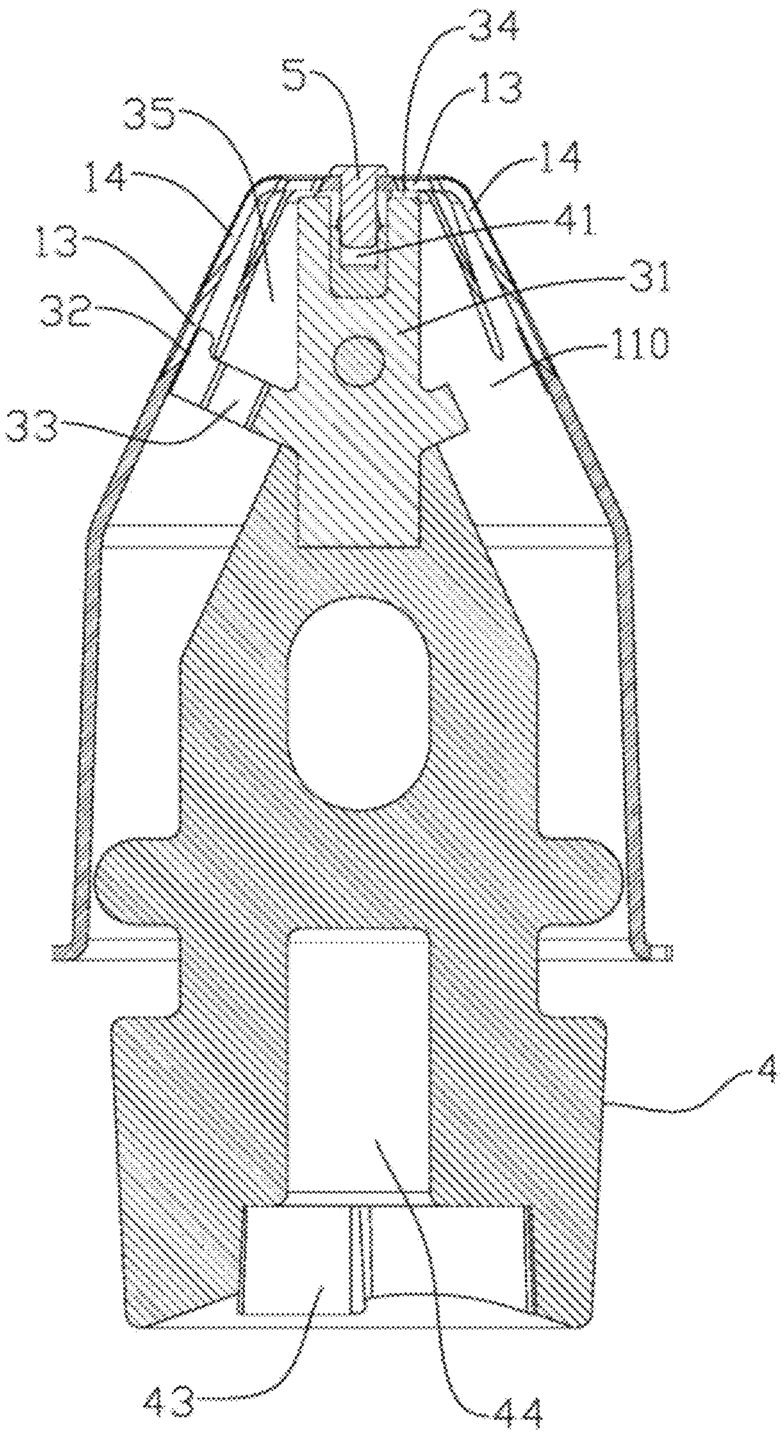
FIG. 11 is a sectional view taken along the direction F-F in FIG. 10.

In an embodiment shown in FIG. 11, the hair inlet slots 13 form a "7"-shaped structure by means of a cover top section located on the cover top and a cover wall section located on the cover wall. The horn-shaped hair guiding openings 14 are connected between the cover top section and the cover wall of the hair inlet slots 13, the side cutter 32 is located below the horn-shaped hair guiding openings 14, and the top cutter 34 is located on the inner side of the horn-shaped hair guiding openings 14. An avoiding opening 35 for avoiding the horn-shaped hair guiding openings 14 is formed between the top cutter 34 and the side cutter 32, so as to avoid the top cutter 34 and the side cutter 32 from cutting the skin squeezed in from the horn-shaped hair guiding openings 14, making it have good safety performance.

Figure 7:
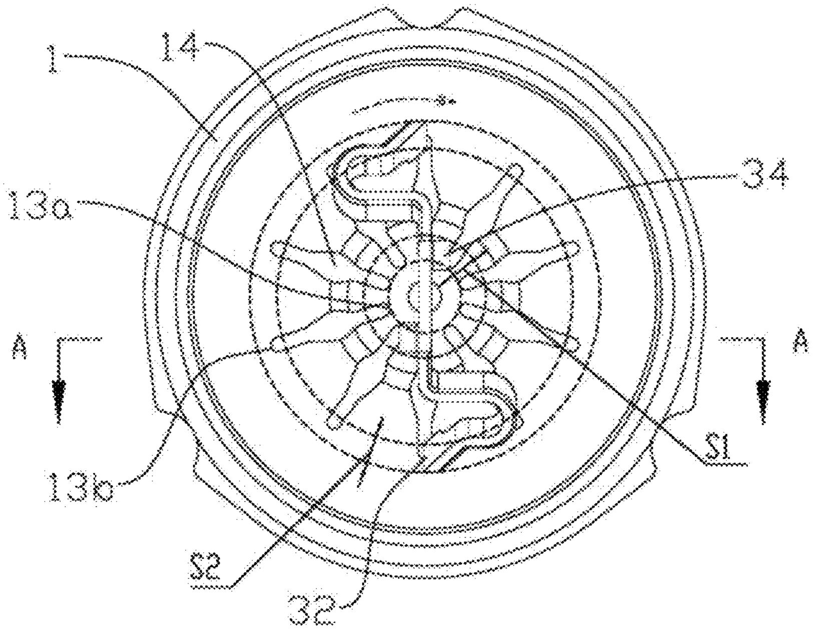
FIG. 7 is a bottom view showing a state in which a cutter head cover of a tapered structure is engaged with a moving cutter.

As shown in an embodiment of FIGS. 7 and 11, the horn-shaped hair guiding openings 14 are located on the outer side of the rotary cutting region S1 of the top cutter 34 to protect the skin. The inner end 13*a* of the hair inlet slots 13 is located in the rotary cutting region S1 of the top cutter 34, then the top cutter 34 has one section located on the inner side of the inner end 13*a* of the hair inlet slots 13 to protect the top cutter 34, and the other section is opposite to the hair inlet slots 13 to ensures effective cutting; the horn-shaped hair guiding openings 14 are located above the rotary cutting region S2 of the side cutter 32 to protect the skin, the lower end 13*h* of the hair inlet slots 13 is located in the rotary cutting region S2 of the side cutter 32, then one section of the side cutter 32 is located below the lower end 13*b* of the hair inlet slots 13 to protect the side cutter 32, and the other section is opposite to the hair inlet slots 13 to ensure effective cutting.

The side cutter 32 and the elastic arm 33 and the top cutter 34 are respectively provided with two around the rotation direction, which not only ensures the quantity and efficiency of cutting, but can also realize integral forming by pressing.

The top of the support 4 is provided with a central positioning slot 41 coaxial with the center of rotation of the support 4, a slot 36 is provided at a position of the moving cutter 3 corresponding to the central positioning slot 41 for the central positioning slot 41 to be exposed upwards, the center of the cover top 111 is provided with a central positioning hole 15 corresponding to the central positioning slot 41, the central positioning hole 15 is isolated from the hair inlet slots 13, a positioning pin 5 passing through the central positioning hole 15 and inserted into the central positioning slot 41 is fixed on the cover top 111, and the positioning pin 5 matches with the central positioning slot 41 and limits the lateral swinging of the support 4; at the same time, the support 4 rotates and floats up and down relative to the positioning pin 5, so that the moving cutter assembly 2 can rotate more smoothly and steadily in the cutter head cover 1 through the cooperation of the positioning pin 5 and the central positioning slot 41.

Figure 15:
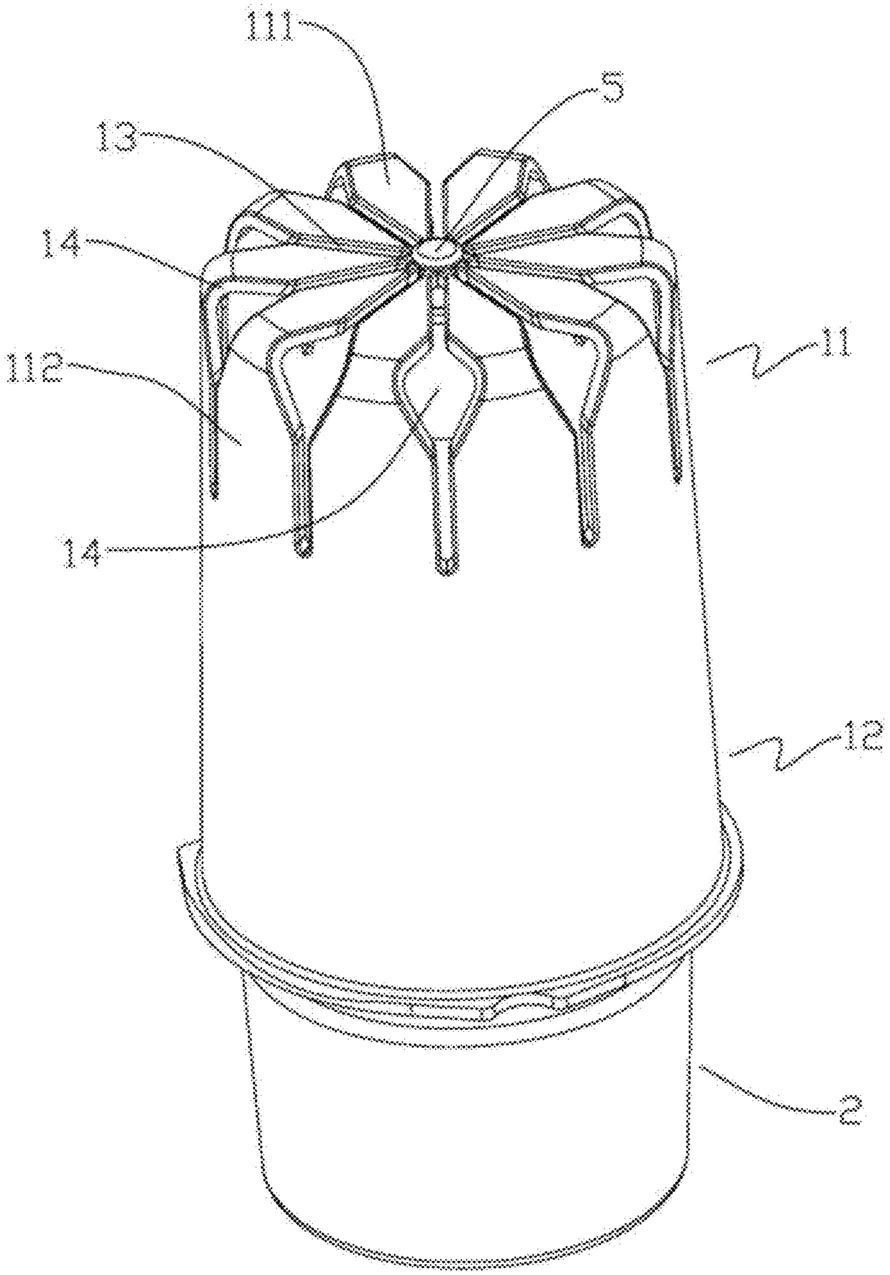
FIG. 15 is a schematic view of a structure of a multi-functional small rotary shaving assembly employing a cutter head cover of a cylindrical structure.

As shown in an embodiment of FIGS. 1 and 15, the positioning pin 5 is located on the inner side of an area enclosed by the cover top section of multiple hair inlet slots 13, preventing the top cap of the positioning pin 5 from covering directly above the hair inlet slots 13 which affects hair inlet, and avoiding the occurrence of hair-tearing.

However, in order to better position the moving cutter assembly 2 inside the cutter head cover 1, the support 4 is provided along its circumferential direction with multiple positioning posts 42 capable of reclining against the inner wall of the cutter head cover 1 for rotational positioning.

In order to improve the accuracy of trimming, as shown in embodiments shown in FIGS. 1-11, the cover wall 112 is of a conical structure, the side cutter 32 is inclined at a certain angle with respect to the center of rotation thereof and the rotation path forms a conical region corresponding to the cover wall 112, the elastic arm 33 is inclined and corresponds to the side cutter 32, and the cover head 11 of a conical structure can be made small at the top end. Preferably, the outer diameter R2 of the cover top 111 is less than 6 mm, preferably the outer diameter R2 is less than 4 mm, and the included angle D between the cover wall 112 and the central axis is between 5° and 45°. The included angle D is preferably between 10° and 40°. Certainly, it may be further optimized between 20° and 30° to allow a more precise cutting position when shaving, and also to facilitate the insertion into a nostril and the nose hair feeding hair from the tapered bevel and the top surface.

The distance c between the side cutters 32 in the natural state and the center of rotation of the side cutters 32 is less than 5 mm. Preferably, c<4 mm, which is adjusted according to the inner diameter of the cover wall 112, and there is always a pre-pressure between the side cutter 32 and the cover wall 112 after the side cutter 32 is mounted in the cover wall 112.

Also, when two or more side cutters 32 and the elastic arms 33 are provided, the cover wall 112 of the tapered structure is combined with the side cutter 32 and the elastic arm 33, and the side cutter 32 can automatically compensate for wear and abut against the cover wall 112, and automatically center.

Figure 14:
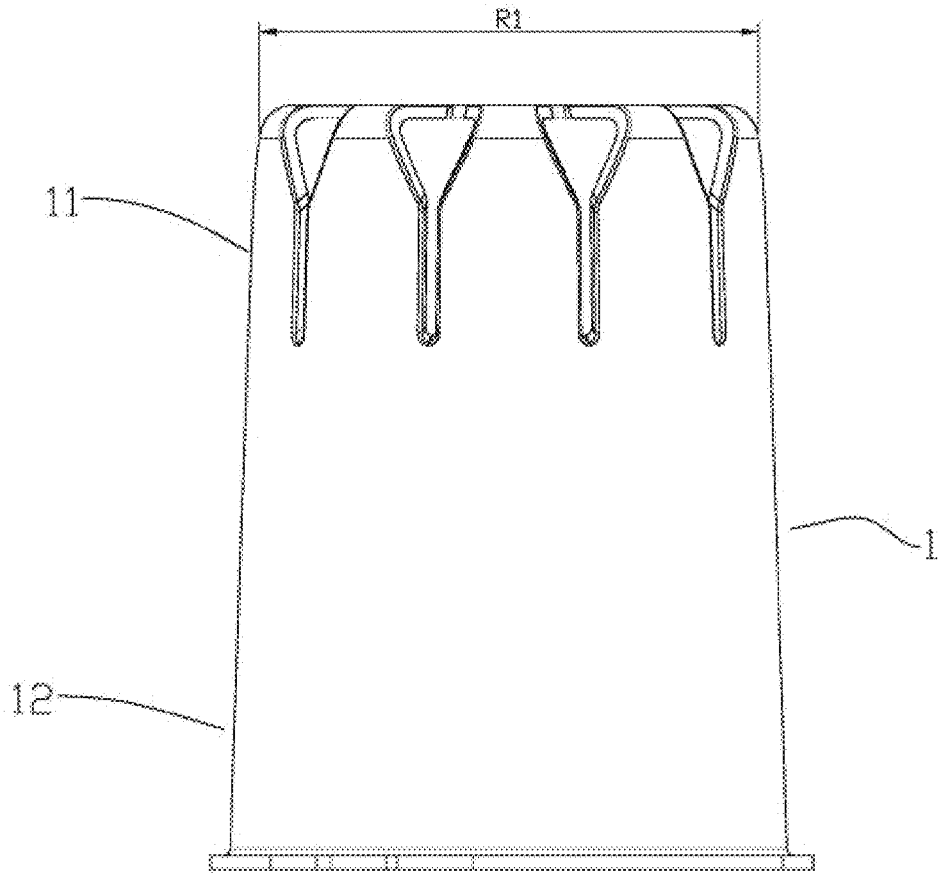
FIG. 14 is a side view of a cutter head cover having a cylindrical structure.

Of course, as shown in FIGS. 14 and 15, as another implementation mode of the cutter head cover 1, the cover head 11 adopts a cylindrical structure, namely, the cover wall 112 is a cylindrical structure, and the outer diameter R1 of the cover head 11 is less than 8 mm. Preferably the outer diameter R1 is less than 6 mm, and the optimal outer diameter R1<4 mm, so as to accurately trim and shape hairs, and insert the same into the nostril; the cylindrical structure has a draft angle of 1° to 3° in order to facilitate press forming draft.

Figure 9:
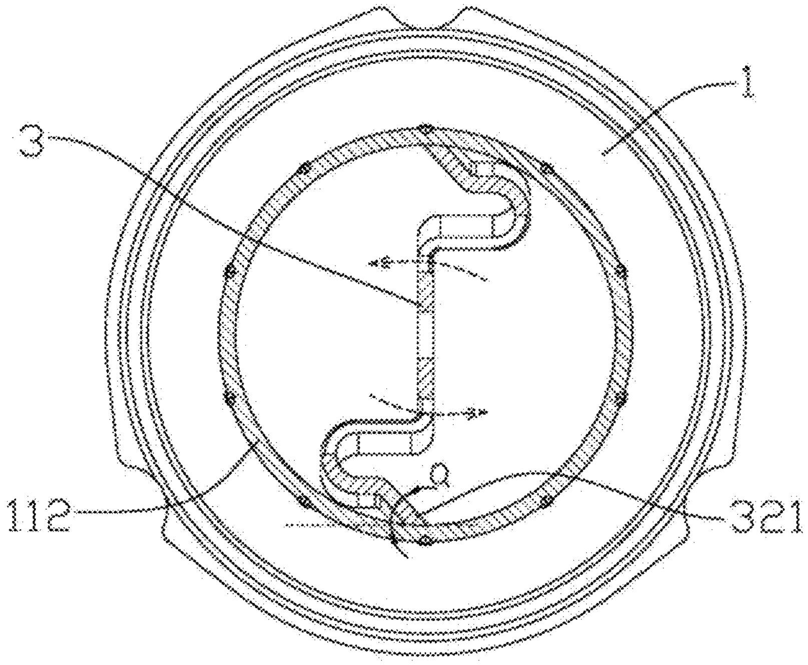
FIG. 9 is a sectional view taken along the direction B-B in FIG. 8.
Figure 10:
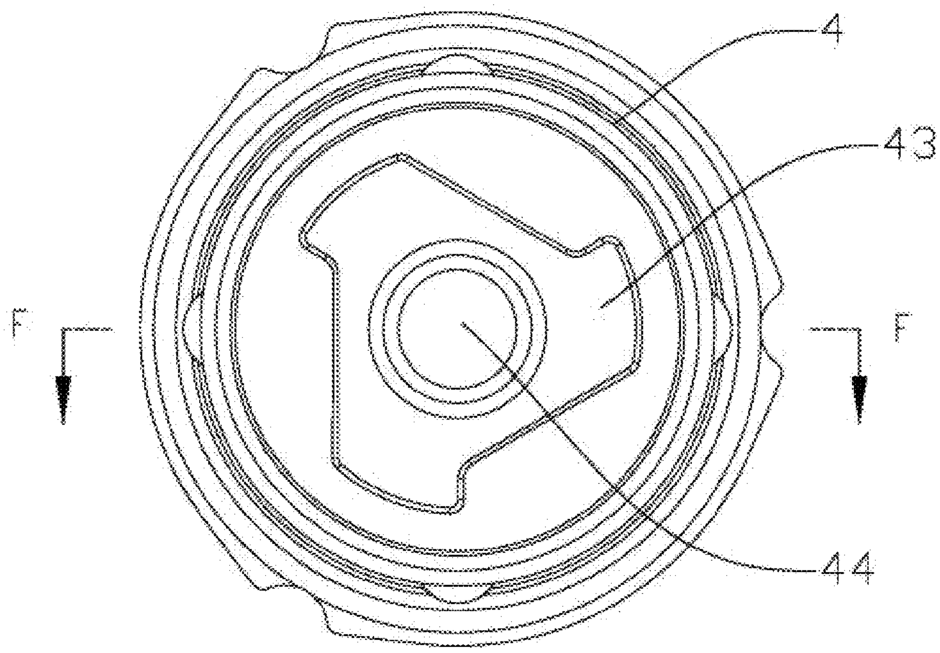
FIG. 10 is a bottom view of a multi-functional small rotary shaving assembly of the present invention.

In order to improve the sharpness of the side cut, as shown in FIG. 9, the side cutter 32 is inclined in the direction of the rotary cut, and the included angle a between the side cutting edge 321 of the side cutter 32 and the cover wall 112 on its tangent line is an acute angle, the included angle a being between 20° and 80°, preferably between 40° and 60°.

Figure 8:
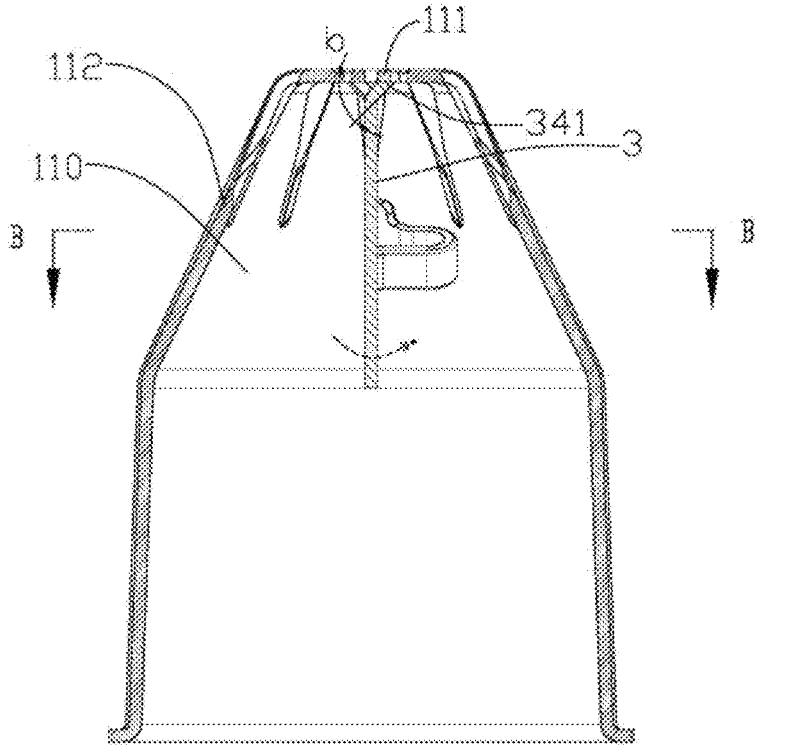
FIG. 8 is a sectional view taken along the direction A-A in FIG. 7.

In order to improve the sharpness of the top surface cutting, as shown in FIG. 8, the top cutter 34 is inclined in the rotatory cutting direction, and the included angle h between the top cutting edge 341 of the top cutter 34 and the cover top 111 is an acute angle, the included angle b being between 20° and 80°, preferably between 40° and 60°.

As shown in embodiments of FIG. 1, FIG. 3, FIG. 7, and FIG. 15, the horn-shaped hair guiding openings 14 have a V-shaped structure facing outward obliquely upward, and respectively form a Y-shaped structure with the hair inlet slot 13 at the cover top 111 and the hair inlet slot 13 at the cover wall 112. Therefore, when feeding hair to the top, it decreases from the outer side to the inner side, and when feeding hair to the side, it becomes smaller from the top to the bottom, while ensuring that both the top surface and the side surface have a good hair feeding effect. Furthermore, it can be machined by one grinding wheel at one time, so that the machining process is simplified.

Since the cover top 111 is relatively small, the cover top 111 adopts a flat-top structure or an outwardly convex spherical arc-shaped structure, which is simple in structure and easy to manufacture and process.

The hair inlet slot 13 is opened in the radial direction of the cover head 11, and multiple hair inlet slots 13 are evenly distributed in the circumferential direction of the cover head 11, which is simple in structure and convenient for machining.

Figure 12:
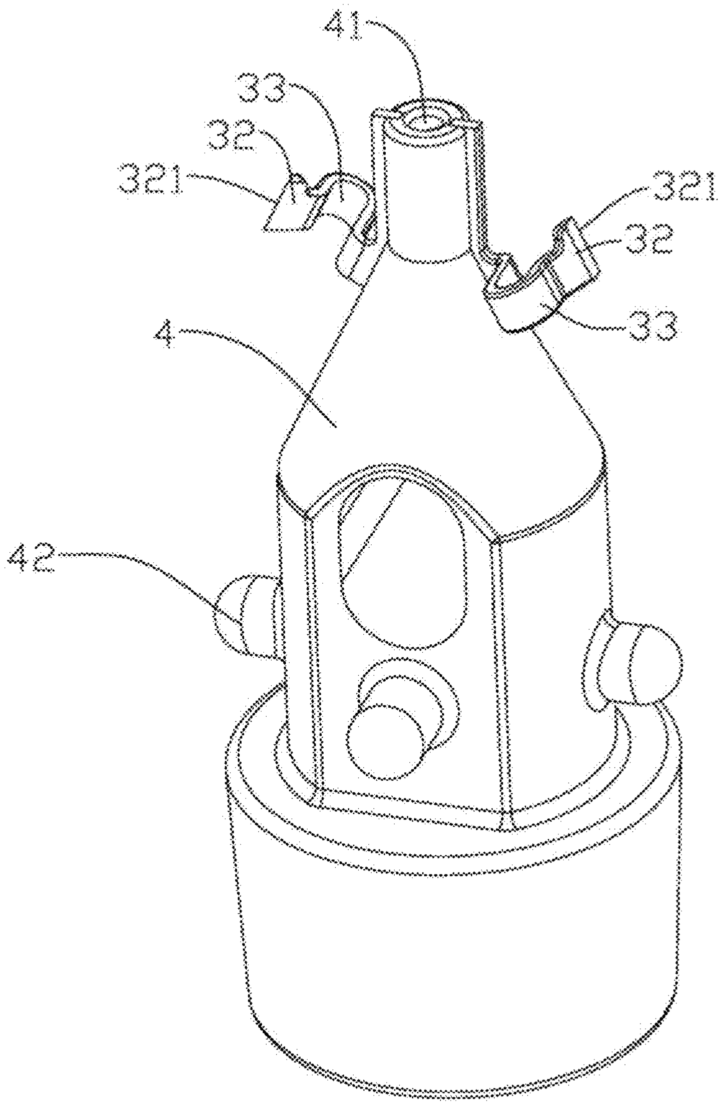
FIG. 12 is a schematic view showing a structure of a second embodiment of a moving cutter.

As shown in FIG. 12, as another embodiment of the moving cutter 3, the moving cutter 3 may have only a side cutting, and the moving cutter 3 comprises a moving cutter body 31. A side cutter 32 for laterally cutting hairs in the hair inlet slot 13 on the cover wall 112 is provided on the side of the moving cutter body 31, an elastic arm 33 fixedly connecting the side cutter 32 and the moving cutter body 31 and elastically pressing the side cutter 32 against an inner wall of the cover wall 112 is provided between the side cutter 32 and the moving cutter body 31, and the elastic arm 33 and the side cutter 32 are located on the outer side of the support 4.

Figure 13:
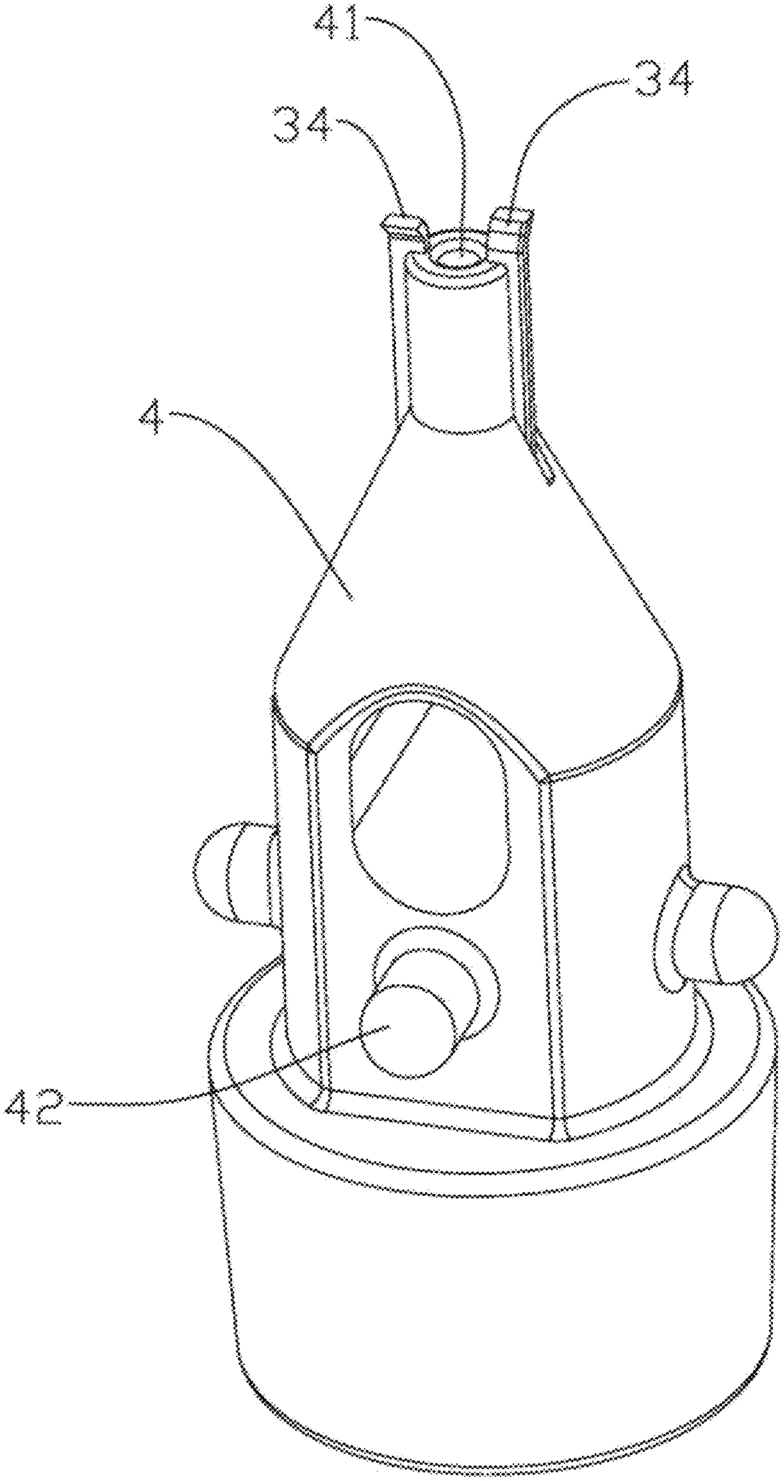
FIG. 13 is a schematic view showing a structure of a third embodiment of a moving cutter.

As shown in FIG. 13, as a third embodiment of the moving cutter 3, the moving cutter 3 may have only a top surface cutting, and the moving cutter body 31 is provided with an upward facing top cutter 34 between the inner side of the side cutter 32 and the rotation center of the moving cutter body 31, and the top cutter 34 is exposed above the support 4 and is used to cut hairs in the hair inlet slot 13 on the cover top 111.

Figure 16:
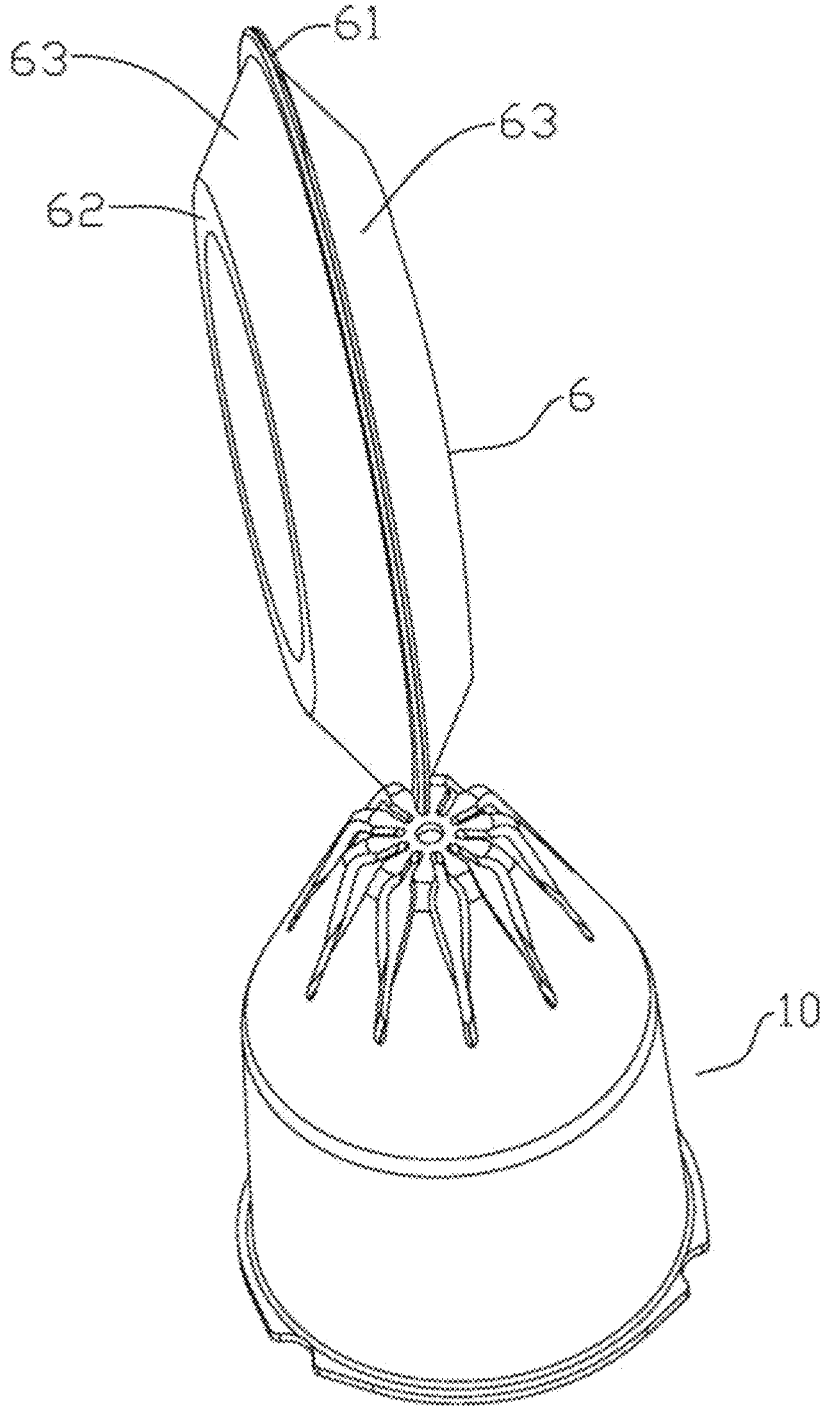
FIG. 16 is a schematic diagram of processing hair inlet slots and horn-shaped hair guiding openings on a cutter head cover.

As shown in FIG. 16, a processing principle of hair inlet slots and horn-shaped hair guiding openings on a cutter head cover is provided: after a cutter head cover body 10 with a lower end opening is punched, a profiling grinding wheel 6 is used to cut a slot between the cover top 111 and the cover wall 112, wherein the profiling grinding wheel 6 comprises an outer ring wheel 61 and an inner ring wheel 62 which are coaxially arranged; the inner ring wheel 62 is located on the inner side of the outer ring wheel 61, and the thickness of the inner ring wheel 62 is greater than that of the outer ring wheel 61, and a chamfer 63 is provided between said inner ring wheel 62 and the outer ring wheel 61 so as to smoothly transition the two; when cutting the hair inlet slot 13, the cutter head cover body 10 is provided obliquely below the profiling grinding wheel 6, and the cutter head cover body 10 is moved relative to the rotating profiling grinding wheel 6; during the feeding process, the 7-shaped hair inlet slot 13 is simultaneously cut on the cover top 111 and the cover wall 112 from obliquely above by means of the outer ring wheel 61; when the feeding proceeds to the chamfer 63, the horn-shaped hair guiding opening 14 is cut out by the chamfer 63 which cutting out a part of the material of the cutter head cover body 10 located on both sides of hair inlet slots 13 at the turning joint between the cover top 111 and the cover wall 112; one hair inlet slot 13 and the corresponding horn-shaped hair guiding opening 14 are completed in one processing: the cutter head cover body 10 is withdrawn relative to the outer profiling grinding wheel 6; rotating one angle is performed to continue the next cutting of the hair inlet slot 13 and the horn-shaped hair guiding opening 14 until all the outer hair inlet slots 13 and outer horn-shaped hair guiding openings 14 are completed, finally, the outer surface edges of the hair inlet slots 13 and the horn-shaped hair guiding openings 14 are polished. The processing method has a simple process and high processing efficiency.

The invention claimed is:

1. A rotary shaving assembly, comprising: a cutter head cover and a moving cutter assembly; wherein the moving cutter assembly comprises a moving cutter and a support for holding the moving cutter, the cutter head cover comprises a cover head and a cover body integrated with the cover head, the cover head comprises a cover top and a cover wall connected to the cover top, the cover top and the cover wall enclose to form a cutting cavity for the moving cutter to rotate inside, and the cover head is provided with multiple hair inlet slots in a circumferential direction for communicating an inside with an outside of the cover head; the multiple hair inlet slots cross from the cover top to the cover wall and pass through the cover top radially and the cover wall downwardly at the same time, and a turning joint between the cover top and the cover wall is provided with horn-shaped hair guiding openings which correspond to the multiple hair inlet slots and which are used for guiding hair into the multiple hair inlet slots; each of the horn-shaped hair guiding openings has an outwardly inclined upwardly V-shaped structure and respectively forms a Y-shaped structure with a hair inlet slot at the cover top and with a hair inlet slot at the cover wall.

2. The rotary shaving assembly according to claim 1, wherein the moving cutter comprises a moving cutter body, a side cutter for laterally cutting the hair in the multiple hair inlet slots on the cover wall is provided on a side of the moving cutter body, an elastic arm fixedly connecting the side cutter and the moving cutter body and elastically pressing the side cutter against an inner wall of the cover wall is provided between the side cutter and the moving cutter body, and the elastic arm and the side cutter are located on an outer side of the support; an upward top cutter is provided between an inner side of the side cutter and a rotational center of the moving cutter body on the moving cutter body, and the top cutter is separated from the side cutter and the elastic arm; the top cutter is exposed above the support and is used to cut the hair in the multiple hair inlet slots on the cover top.

3. The rotary shaving assembly according to claim 2, wherein the multiple hair inlet slots forms a "7"-shaped structure by means of a cover top section located on the cover top and a cover wall section located on the cover wall; the horn-shaped hair guiding openings are connected between the corresponding cover top section and the cover wall section of the multiple hair inlet slots, the side cutter is located below the horn-shaped hair guiding openings, and the top cutter is located on an inner side of the horn-shaped hair guiding openings; an avoiding opening for avoiding the horn-shaped hair guiding openings is formed between the top cutter and the side cutter.

4. The rotary shaving assembly according to claim 3, wherein the horn-shaped hair guiding openings are located on an outer side of a rotary cutting region (S1) of the top cutter, and an inner end of the multiple hair inlet slots is located in the rotary cutting region (S1) of the top cutter; the horn-shaped hair guiding openings are located above a rotary cutting region (S2) of the side cutter, and a lower end of the multiple hair inlet slots is located in the rotary cutting region (S2) of the side cutter.

5. The rotary shaving assembly according to claim 2, wherein the top cutter, the side cutter, the elastic arm, and the moving cutter body are integrally press formed, the moving cutter body being integrally injection molded with the support.

6. The rotary shaving assembly according to claim 5, wherein the side cutter and the elastic arm and the top cutter are respectively provided with two arranged around the rotational center.

7. The rotary shaving assembly according to claim 2, wherein the cover wall has a conical structure, the side cutter being inclined at an angle to a center of rotation thereof and making its path of rotation forming a conical area corresponding to the cover wall, and the elastic arm being inclined and corresponding to the side cutter.

8. The rotary shaving assembly according to claim 2, wherein the side cutter has a side cutting edge, the side cutter being inclined in a direction of rotary cutting, and an included angle (a) between the side cutting edge and the cover wall on its tangent line being an acute angle.

9. The rotary shaving assembly according to claim 2, wherein the top cutter is provided with a top cutting edge, the top cutter is inclined in a direction of rotary cutting, and an included angle (b) between the top cutting edge and the cover top is an acute angle.

10. The rotary shaving assembly according to claim 2, wherein the elastic arm is of a U-shaped structure.

11. The rotary shaving assembly according to claim 1, wherein a top of the support is provided with a central positioning slot coaxial with a center of rotation of the support, a slot is provided at a position of the moving cutter corresponding to the central positioning slot for the central positioning slot to be exposed upwards, the center of the cover top is provided with a central positioning hole corresponding to the central positioning slot, the central positioning hole is isolated from the multiple hair inlet slots, a positioning pin passing through the central positioning hole and inserted into the central positioning slot is fixed on the cover top, and the positioning pin matches with the central positioning slot and limits lateral swinging of the support; at the same time, the support rotates and floats up and down relative to the positioning pin.

12. The rotary shaving assembly according to claim 11, wherein the positioning pin is located on an inner side of an area enclosed by cover top sections of the multiple hair inlet slots.

13. The rotary shaving assembly according to claim 1, wherein the moving cutter comprises a moving cutter body, a side cutter for laterally cutting the hair in the multiple hair inlet slots on the cover wall is provided on a side of the moving cutter body, an elastic arm fixedly connecting the side cutter and the moving cutter body and elastically pressing the side cutter against an inner wall of the cover wall is provided between the side cutter and the moving cutter body, and the elastic arm and the side cutter are located on an outer side of the support.

14. The rotary shaving assembly according to claim 13, wherein the cover wall has a conical structure, the side cutter being inclined at an angle to a center of rotation thereof and making its path of rotation forming a conical area corresponding to the cover wall, and the elastic arm being inclined and corresponding to the side cutter.

15. The rotary shaving assembly according to claim 13, wherein the side cutter has a side cutting edge, the side cutter being inclined in a direction of rotary cutting, and an included angle (a) between the side cutting edge and the cover wall on its tangent line being an acute angle.

16. The rotary shaving assembly according to claim 13, wherein the elastic arm is of a U-shaped structure.

17. The rotary shaving assembly according to claim 1, wherein the moving cutter comprises a moving cutter body provided only with an upwardly facing top cutter which is exposed above the support and which is used for a rotary cutting of the hair in the multiple hair inlet slots on the cover top.

18. The rotary shaving assembly according to claim 17, wherein the top cutter is provided with a top cutting edge, the top cutter is inclined in a direction of rotary cutting, and an included angle (b) between the top cutting edge and the cover top is an acute angle.

19. The rotary shaving assembly according to claim 1, wherein the cover head is circular in cross-section and the cover wall is of a cylindrical structure or a conical structure, the cover head has an outer diameter (R1) of less than 8 mm when the cover wall is of the cylindrical structure; when the cover wall is of the conical structure, an outer diameter (R2) of the cover top is less than 6 mm and an included angle (D) between the cover wall and a central axis of the cover body is between 5° and 45°.

* * * * *